US006294752B1

(12) United States Patent
Kuchuk-Yatsenko et al.

(10) Patent No.: US 6,294,752 B1
(45) Date of Patent: Sep. 25, 2001

(54) METHOD OF FLASH-BUTT WELDING

(76) Inventors: Sergei I. Kuchuk-Yatsenko, art. 18, 17 Stretenskaya st., 01025, Kyiv; Alecsandr V. Didkovskiy, art. 12, 10 Chokolovskii avenue, 03186, Kyiv; Mikhail V. Bogorskiy, art. 120, 30/51 Ozernaya st., 04209, Kyiv; Valeriy G. Krivenko, Art. 147, 11 Suvorova St., 01010, Kyiv; Alexei I. Gorishnyakov, art. 43, 89 Frunze st., 04080, Kyiv; Vadim P. Krivonos, art. 51, 4a Komandarma Kameneva st., 01133, Kyiv, all of (UA)

(*) Notice: Subject to any disclaimer, the term of this patent is extended or adjusted under 35 U.S.C. 154(b) by 0 days.

(21) Appl. No.: 09/488,174

(22) Filed: Jan. 20, 2000

(51) Int. Cl.⁷ .................................................... B23K 11/04
(52) U.S. Cl. ............................ 219/100; 219/55; 219/91.1
(58) Field of Search ........................... 219/100, 55, 61.5, 219/86.41, 86.7, 86.61, 91.1, 104, 110

(56) References Cited

U.S. PATENT DOCUMENTS

| 3,748,431 | * | 7/1973 | Melbard et al. . | |
|---|---|---|---|---|
| 3,790,739 | * | 2/1974 | Lifshits et al. . | |
| 4,044,219 | * | 8/1977 | Lebedev et al. . | |
| 4,101,753 | | 7/1978 | Buff et al. .............................. | 219/97 |
| 4,208,569 | * | 6/1980 | Kuchuk-Yarsenko et al. . | |
| 4,296,305 | * | 10/1981 | Lifshits et al. . | |
| 4,383,162 | | 5/1983 | Ellis ...................................... | 219/100 |
| 4,415,793 | * | 11/1983 | Podola et al. . | |
| 4,471,203 | * | 9/1984 | Lebedev et al. . | |
| 5,270,514 | * | 12/1993 | Wechselberger et al. . | |
| 6,169,263 | * | 1/2001 | Derby, Jr. et al. . | |

FOREIGN PATENT DOCUMENTS 62-57785  3/1987  (JP) .
1278154  1/1978  (SU) .

OTHER PUBLICATIONS

B. D. Orlov, Technology and Equipment of Contact Welding. (no date available).
A. D. Lovlya, et al., Method for Regulating the Process of Contact Joint Welding, 241567. (no date available).
S. I. Kuchka Yatzenko, Equiptment for Contact Welding or Rails and its Exploitation, 1974.
M.S. Kabanov, et al., Method for Regulating the Process of Contact Joint Welding, 593857. (no date available).
M. Sh. Solodovnikov, et al., Method for Contact Joint Welding, 313628. (no date available).

* cited by examiner

*Primary Examiner*—Tom Dunn
*Assistant Examiner*—Colleen Cooke

(57) ABSTRACT

A method of flash-butt welding in which the travel speed ($V_t$) of the machine mobile plate and the welding voltage ($U_2$) are changed (by preset programs) and the travel speed is controlled through negative feedback by welding current, the voltage being changed discretely for each flashing fixed interval of $t_m$ duration as a function of the increment of the actual average speed of flashing details of shortening ($V_a$) during the previous flashing interval, $V_a$ value being maintained at the present level, lower than $V_m$. The invention envisages a change of the coefficient of enhancement of the negative feedback in a discrete manner for each preset flashing interval of $t_m$ duration as a function of $V_a$ increment during the previous flashing interval. The invention further provides for an increase in the value of $U_2$ and a decrease of the coefficient of negative feedback to the set value until the speed has reached the set value of speed $V_f$ at which upsetting is switched on, or after the set value of $Q_m$ has been reached, $U_2$ is increased and the coefficient of negative feedback is decreased to the set value, these values remaining constant until upsetting is switched on.

8 Claims, No Drawings

METHOD OF FLASH-BUTT WELDING

TECHNICAL FIELD

The claimed invention pertains to flash-butt welding, predominantly to welding of items of a large cross-section, and can be applied in various industries where flash butt welding is used.

BACKGROUND ART

Known is a process of flash-butt welding with a rigid program control of flashing speed (<<Technology and equipment of flash-butt welding>> B. D.Orlov, Yu. V.Dmitriev, et al., Moscow <<Mashinostrojenie>> 1975, see (p.280), where the value of the allowance for welding and upsetting is programmed. Such systems are operating reliably under the conditions in which self-regulation of flashing is ensured in a broad range of parameters, i.e. in welding of parts of a comparatively small cross-section (for sections of up to 1000–1500 $mm^2$) and in welding with preheating. The program of speed variation is usually accomplished by means of cams and is predetermined.

The main disadvantage of the systems of programming by travel is the need to ensure an accurate preparation of the end faces of the parts to be welded, prior to welding. Inaccurate positioning of the parts prior to welding, non-uniform gap between the parts, change of the geometrical dimensions of edge preparation—all these deviations require an appropriate correction of the optimal allowance for flashing and change of the assigned program, especially in welding of large cross-sections where the process of flashing excitation is especially difficult and requires high power consumption.

Known is a method of continuous flash-butt welding in which a coefficient of negative feedback by current is used, which is changed during welding with the change of voltage. The process of flashing by this method is described on pages 55–59 of the book edited by S. I.Kuchuk-Yatsenko "Equipment for flash-butt welding of rails and its operation", Kiev. "Naukova Dumka". 1974. This method is used in continuous flash-butt welding of parts of a large cross-section. The control of the change of the transformer voltage and of the flashing speed is set as a function of flashing time. In welding with the above prior art method, the coefficient of negative feedback by welding current is set at the start of welding, and after some time, at the moment of the welding voltage switching, the negative feedback coefficient is changed. With this method the change of the negative feedback coefficient is connected with the change of welding voltage.

In this method the change of the negative feedback coefficient is not connected with heating of the parts being welded. With this method the speed of the parts drawing together and the coefficient of negative feedback by current is set prior to welding. After the parts contact each other, the welding current flows through the welding circuit and flashing starts. The flashing speed (actual speed of drawing together) is determined both by the set speed of the parts drawing together, and by the coefficient of negative feedback by current. At the start of welding, when the part end faces are cold, the flashing process requires a high power. As the parts being welded are heated, the welding current drops, if the set speed of drawing together is low (of the order of 0.1–0.4 mm/s). Lowering of welding current (it is due to heating of the parts being welded) leads to reduction of power consumption and heating intensity. In this case also the intensity of heating the parts being welded, is, lowered as the losses of energy consumed in the parts heating become greater with the increase of the flashing speed. Lowering of heating intensity increases the welding time. Now if the set speed of the parts drawing together is high, excitation of the welding process is problematic. Transition to a short-circuit is possible at the start of the process. This method envisages lowering of welding voltage and change of the negative feedback coefficient at the moment of voltage switching. This technique somewhat increases the heating intensity. This measure, however, is not effective enough, as lowering of welding voltage leads to reduction of the set power of the welding machine, as well as of the useful power.

This method does not allow assessment during flashing of the change of the physical condition of the end faces of parts being welded. This essentially influences the quality of the welded joint and the stability of production of a sound joint. This method does not envisage automatic selection of the most favorable moment for change of voltage and performance of upsetting.

Known is a method of flash-butt welding in which upsetting is switched on when the specified temperature of the parts being welded has been reached (USSR A.C. 241567). The Curie point is taken as the specified preheating temperature, whereas the command pulse is given with an electromagnetic device measuring the size of the zone of preheating of the end faces being welded.

The quality of welded joints in flash-butt welding is determined not only by the preheating zone, but also by many other factors, for instance gradient of the temperature field of the preheating zone, temperature of end faces heating, mains voltage variation, flashing nature, speed of flashing in heating and prior to upsetting, upset value and many others. The above method takes into account only the width of the heating zone, but it does not provide the required stability of the welded joint quality.

Known is a flash-butt welding method (A.C. 313628) in which the flashing process is changed to accelerated flashing with subsequent upsetting. The value of flashing speed is a signal for switching on accelerated flashing and upsetting.

This method does not envisage control of the welding process at the stage of heating, i.e. during the longest period of welding.

In welding of parts this method does not permit assessment of the degree of heating of the parts being welded, or switching to accelerated flashing and upsetting at the most favorable moment which will ensure a high quality of welded joint.

Known is a method of regulation of the process of flash-butt welding (USSR A.C. 593857) by the action of the machine mobile plate, depending on the mismatch signal generated as a result of comparison of the actual and assigned value of the parameter characterizing the flashing process. In this case the energy evolved in the butt is used as the parameter characterizing the flashing process, in order to stabilize the quality of the joints at the arising disturbances by voltage or other energy parameters of the process.

This method provides the stability of heating in welding, as heating of parts in this case does not depend on random changes of the welding mode parameters, which determine the heating.

However, in welding of parts with a large cross-section, it is impossible to achieve the required heating of the parts being welded, and this welding process does not envisage correction of the welding parameters (for instance, welding voltage, feedback coefficient, flashing speed).

Known is a device and method of flash-butt welding (U.S. Pat. No. 4,101,753), predominantly of the strip ends in continuous rolling lines and the corresponding device for implementation of this method, in which energy fed into the joint zone, is measured continuously, and the current is switched off at the upsetting stage when the specified energy value has been achieved. The device consists of the drive of the parts movement, current supplies, upset drive, ignitron contactor connected into the primary winding of the welding transformer and machine control system. This system consists of the memory block connected with the device of energy measurement at the flashing stage, block of comparison of the energy supplied during the entire welding cycle and the reference value of energy, as well as an output logic block which forms the command for the contactor switching off. In this case, the amount of energy supplied at the upsetting stage depends on the energy supplied at the flashing stage. Also provided is a device for recording and storing the values of energy in each stage of the process, this allowing assessment of the welded joint quality.

This prior art device allows supplying the same amount of energy to the parts being welded, irrespective of the main voltage variations. In welding, however, the heating of the parts being welded is influenced not only by the amount of the input energy, but also by the nature of flashing, and this prior art device does not envisage control or correction of welding parameters (for instance, welding voltage, feedback coefficient, flashing speed). Moreover, it does not envisage automatic control of the average flashing speed for selection of the most favorable moment for upsetting performance. This essentially influences the quality of the welded joint and the stability of the sound joint production.

Known is an electric circuit of control of flash-butt welding machines (U.S. Pat. No. 4,383,162), which is designed for adjustment of the start of upsetting in the flash-butt welding machines, depending on the flashing energy. The circuit can have additional elements allowing regulation of the upsetting start, depending on the position of the welding machine plate. The welder is capable of selection of the method of control of the upsetting start. The electric circuit can be complemented by elements for control of the movement of the mobile plate of the welding machine during the cycle of welding prior to upsetting.

This prior art electric circuit provides stability of heating in welding of a small section, as the parts heating in this case does not depend on random changes of the welding mode parameters, which determine the heating. The heating stability, however, is a mandatory but insufficient condition for ensuring a stable quality of the joint, especially in welding of parts of a large cross-section in the machines using a power source of a limited power. In welding of parts of a large cross-section, it is impossible to achieve the required heating of the parts being welded without correction of the welding parameters, and this circuit does not envisage correction of the welding parameters (for instance, welding voltage, feedback coefficient, flashing speed).

An important factor influencing the joint quality, is the flashing speed at the moment before upsetting. In this case the flashing speed is understood to be a parameter characterizing the process of the end faces flashing (quantity of the melted out metal per a unit of time), and not the travel of the mobile plate of the machine. In welding with this circuit, switching on of upsetting can occur at different values of the flashing speed. Therefore, the joints quality will differ. Here, the insufficient speed of the parts flashing prior to upsetting, will result in a poor quality of the joint. This factor is aggravated when the welding machine is powered by supplies of a limited power. This is a disadvantage of the above method.

Known is a method of flash-butt welding (Japanese Patent 62-57785) in which the moment of upsetting start is determined by the quantity of heat energy accumulated in the parts being welded, in order to optimize the mode of flash-butt welding. For this purpose the data from the power sensor connected to the welding transformer primary winding, and the data on the amount of sparks flying out of the gap during the bridges explosion from the sensor located in the welding zone, are entered into the system of control of the welding machine. The control system after the subsequent division of the signals by the cross-sectional area of the parts being welded, determines the specific value of energy consumed for the end faces melting and the thermal energy lost in ejection of the bridges metal from the gap. After that the system finds the difference of energies and when this value becomes equal to the preset one, the system issues the command for upsetting.

This method ensures the repeatability of the input energy at the moment of upsetting switching on, but this is insufficient for provision of the required stable heating, as heating is influenced by the nature of flashing. This process does not envisage variation of the welding parameters, for instance of the current feedback coefficient, voltage, etc. Furthermore, it does not envisage or determine the moment of transition to a higher flashing speed or automatic control of upsetting switching on at a preset flashing speed. Upsetting can be switched on at different values of flashing speed. Therefore, the joint quality will be different Here, the insufficient speed of the parts flashing prior to upsetting will lead to a poor quality of the joint. This factor is aggravated when the welding machine is powered by sources of a limited power. This is a disadvantage of the above method.

The closest to the claimed method is the method of flash-butt welding (USSR A.C. is 1278154, Ukrainian Patent 317) selected as a prototype, in which during welding the welding parameters are measured, the value of travel speed $V_t$ is set and the impact of negative feedback is changed during welding. In this case the impact of negative feedback is reduced as the parts being welded are heated. In welding of compact cross-sections, the impact of the negative feedback is decreased by reduction of the negative feedback coefficient. In welding of thin-walled parts, the impact of negative feedback is decreased by increasing the set value of travel speed of the machine mobile column. Heating of the parts being welded is assessed by the flashing time, and the impact of negative feedback is decreased as the flashing time passes, or by the extent of parts flashing and the impact of negative feedback is decreased with the increase of the parts flashing. Moreover, the method envisages a decrease of the impact of negative feedback when the actual flashing speed exceeds the set flashing speed. The method also envisages a decrease of the initial value of negative feedback by a value proportional to the value of the consumed electric energy, flashing switching on at a higher speed and upsetting by a preset program.

This prior art method provides a stable heating in welding, as parts heating in this case does not depend on random changes of the welding mode parameters, which determine the heating.

Among the disadvantages of this prior art method is the fact that when it is used mostly in the heavy electric welding equipment, interruptions in the welding current flowing can occur at the moments of drawing apart the end faces of the parts being welded, which cause a lower efficiency of heating. This is related to the fact that the mobile column of the large welding machines has a considerable weight and, as a result, has a high inertia. Therefore, when the parts being welded are brought apart at a high speed, the mobile plate can move farther than the position which provides a decrease of the welding current to the value at which a signal is given for drawing of the parts together. This leads to breaking up of the contact bridges between the end faces being flashed, and a much greater decrease in the welding current than is required for maintaining a stable flashing, or complete interruption of its flowing occur.

Another shortcoming of this prior art prototype is the fact that the speed of drawing together and apart of the parts are values dependent on the current flowing through the parts being welded. In this connection the following negative phenomena can occur. With a relatively small signal for the parts drawing together, the mobile plate of the machine will move forward with a small speed, respectively, and the speed of formation and growth of contact bridges, and, hence, also the rate of rise of the current flowing through the parts being welded, will also be small. On the other hand, with a relatively large signal for bringing apart the parts being welded, the machine mobile part will move backward at a high speed, respectively, and as a result the contact bridges will quickly break up and cool down, and the rate of lowering of the current flowing through the parts being welded, will also be high, respectively. Therefore, the effectiveness of heating the parts being welded will not be high enough, as the maximal possible rate of current rise and the minimal possible rate of its lowering, are required for achievement of the maximal heating effectiveness. This can be implemented if the process is monitored and controlled, changing the welding parameters in each small preset welding interval.

An important factor influencing the joint quality, is the speed of flashing at the moment prior to upsetting. In welding by this method, upsetting can be switched on at different values of the flashing speed. This prior art method, however, does not provide an automatic selection of the most favorable moment for upsetting performance. This significantly influences the quality of the welded joint and the stability of production of a sound joint. Therefore, the quality of the joints will differ. Here an insufficient value of the flashing speed will lead to a poor quality of the joint.

DESCRIPTION OF AN EMBODIMENT

The invention solves the problem of improvement of the efficiency of flash-butt welding by intensification of heating of the parts being welded, reduction of flashing allowance, automation of the entire process and stabilization of the welded joint quality.

The essence of the invention consists in that in the claimed method of flash-butt welding, the travel speed of the machine mobile plate ($V_t$) and welding voltage ($U_2$) are varied (by preset programs), and the travel speed is influenced through negative feedback by welding current, the voltage being changed discretely for each flashing fixed interval of $t_m$ duration as a function of the increment of the actual average speed of flashing ($V_a$) is during the previous flashing interval, $V_a$ value being maintained at the present level, lower than $V_t$.

A method of flash butt welding large sections in the form of rails is taught in U.S. Pat. No. 5,979,738 to Kucuk-Yatsenko, et al. issued on Nov. 9, 1999, which is incorporated herein by reference.

In welding of large compact sections, as well as in welding in the machines with a limited power, the claimed method of flash-butt welding provides for the change of the coefficient of enhancing the negative feedback in a discrete manner for each specified flashing interval of $t_m$ duration as a function of $V_a$ increment during the previous flashing interval.

Also, for a fast transition to the increased speed prior to upsetting after reaching the set number of intervals, the claimed invention envisages an increase in $U_2$ value and decrease of the coefficient of negative feedback to the set value until the flashing speed has reached the fixed value of speed $V_f$, at which upsetting is switched on, or when the set value of $Q_m$, which is the optimal quantity of heat energy transferring to the butt ends of the parts being welded, has been reached, $U_2$ is increased, and the coefficient of negative feedback is reduced to the set value, these values remaining constant till upsetting is switched on.

The claimed invention determines the most favorable moment of automatic change of welding parameters and upsetting switching on, by determination of achievement of the fixed level of $V_a$ in a fixed period of flashing, at which it is necessary to change the parameters of welding or switch on the upsetting.

The proposed method of flash-butt welding allows complete automation of the welding process, stabilizing of the heating of the parts being welded and production of a stable high quality of the welded butts even with fluctuations of the mains voltage and change of the impedance of the welding machine circuit through self-regulation of the welding process.

Analyzing the analogues (other known solutions with similar features), the prototype and the proposed method, one can note that the proposed method is characterized by novelty and essential differences which allow the set goal to be reached.

INFORMATION CONFIRMING THE ABILITY TO IMPLEMENT THE INVENTION

The proposed method of flash-butt welding has been tested in laboratory in welding of R65 rails in K190 type machine.

The value of the signal which determines the travel, is set so that the idle travel speed of the machine mobile column is equal to 1.8 mm/s, negative feedback by welding current being used here. The coefficient of negative feedback is selected experimentally so that at the welding current of 10000 A, at the initial moment when the process is excited, the speed of the mobile column drawing together is zero. The actual flashing speed is measured discretely in each fixed flashing interval of 1 s during the flashing process. When the actual flashing speed reaches the value of 0.5 m/s, the coefficient of negative feedback is changed in steps. The step size was selected so that at zero flashing speed, the current value rose by 2500 A, and the actual average speed did not exceed 0.5 mm/s. When the actual flashing speed exceeded 0.5 m/s, further change of the coefficient of negative feedback was performed automatically. After the welding current has reached 40000 A, in order to provide the required preheating of the parts being welded, the welding voltage was lowered by 1 V and the coefficient of negative feedback was changed so that the actual average flashing speed did not exceed a speed of 0.5 mm/s. After the butt welding consumed 3 kWh, welding voltage was automatically increased up to 7 V, and the coefficient of negative feedback was lowered. When the flashing speed reached 1.2 mm/s, upsetting was performed.

In welding with this process, the welding duration was 75 s. Flashing allowance was 12 mm. During testing, the welded joints demonstrated a higher stability and quality than in welding with the previously known welding methods.

The foregoing is a description of a preferred embodiment of the method of flash butt welding using the present invention. It is conceivable however, that various modifications or alterations can be made to result in other embodiments all of which are within the purview of this invention. All such other embodiments are intended to be covered within the scope of this invention.

What is claimed is:

1. A method of flash-butt welding in which the travel speed ($V_t$) of the machine mobile plate and the welding voltage ($U_2$) are changed and the travel speed is controlled through negative feedback by welding current, characterized in that the voltage is changed discretely for each flashing fixed interval of $t_m$ duration as a function of the increment of the actual average speed of flashing details of shortening ($V_a$) during the previous flashing interval, $V_a$ value being maintained at the preset level, lower than $V_t$.

2. A method of item 1 characterized in that the coefficient of enhancement of the negative feedback is changed discretely for each preset flashing interval of $t_m$ duration as a function of $V_a$ increment during the previous flashing interval.

3. A method of item 1 characterized in that after the set number of intervals has been reached, $U_2$ values are increased and the negative feedback coefficient is reduced to the set value.

4. A method of item 1 characterized in that after the set value of $Q_m$ (optimal quantity of heat (energy) transferring to the butt ends of parts being welded) has been reached, $U_2$ is increased and the negative feedback coefficient is reduced to a preset value.

5. A method of item 1 characterized in that after the assigned level of $V_a$ has been reached in the final period of flashing, upsetting is switched on.

6. A method of flash but welding of two similar cross sections using a welding machine wherein $V_t$ is a travel speed of a mobile plate of the welding machine; $U_2$ is a monitored value of welding voltage; $V_a$ is an average speed of flashing which is represented by a speed with which the two similar cross sections to be welded are brought together for welding; and wherein $t_m$ is a fixed time interval for each flashing, the method comprising the steps of:

generally controlling $V_t$ and $U_2$ as per a predetermined program based on parameters of the cross sections to be welded;

modifying welding voltage $U_2$ for each time interval $t_m$ as a function of an increment of average speed $V_a$; and selectively maintaining the average speed $V_a$ to be lower than $V_t$.

7. A method as in claim 6 including the step of controlling the speed $V_t$ based on a feedback from a measured value of welding current.

8. A method as in claim 6 including the step of upsetting which is a fast drawing together of molten surfaces of said two similar cross sections, wherein the step of upsetting is switched on automatically after an assigned value of $V_a$ is reached.

* * * * *